United States Patent
Wetzel (10) Patent No.: US 11,325,462 B2
(45) Date of Patent: May 10, 2022

(54) CAPLESS CLOSURE ASSEMBLY FOR FUEL-TANK FILLER PIPE

(71) Applicant: Stant USA Corp., Connersville, IN (US)

(72) Inventor: Paul C. Wetzel, Oxford, OH (US)

(73) Assignee: Stant USA Corp., Connersville, IN (US)

( * ) Notice: Subject to any disclaimer, the term of this patent is extended or adjusted under 35 U.S.C. 154(b) by 0 days.

(21) Appl. No.: 16/775,736

(22) Filed: Jan. 29, 2020

(65) Prior Publication Data

US 2020/0361312 A1 Nov. 19, 2020

Related U.S. Application Data

(63) Continuation-in-part of application No. 16/514,037, filed on Jul. 17, 2019, now Pat. No. 11,014,444.

(60) Provisional application No. 62/847,499, filed on May 14, 2019.

(51) Int. Cl.
*B60K 15/04* (2006.01)
*B60K 15/035* (2006.01)
*B60K 15/01* (2006.01)

(52) U.S. Cl.
CPC .............. *B60K 15/04* (2013.01); *B60K 15/01* (2013.01); *B60K 15/035* (2013.01); *B60K 2015/03552* (2013.01); *B60K 2015/03576* (2013.01); *B60K 2015/048* (2013.01); *B60K 2015/0461* (2013.01)

(58) Field of Classification Search
CPC ...... B60K 15/04; B60K 15/01; B60K 15/035; B60K 15/03552; B60K 15/048; B60K 15/03576; B60K 15/0461; B60K 15/047; B60K 15/458; B60K 15/0429
USPC ........................................................ 141/350
See application file for complete search history.

(56) References Cited

U.S. PATENT DOCUMENTS

| | | | |
|---|---|---|---|
| 5,732,840 A | 3/1998 | Foltz | |
| 6,189,581 B1 ‡ | 2/2001 | Harris | B60K 15/04 137/58 |
| 6,431,228 B2 ‡ | 8/2002 | Foltz | B60K 15/05 141/30 |
| 6,691,750 B1 ‡ | 2/2004 | Foltz | B60K 15/04 141/35 |
| 6,732,840 B2 ‡ | 5/2004 | Ikeda | F16D 51/20 188/10 |
| 6,755,057 B2 ‡ | 6/2004 | Foltz | B60K 15/04 |

(Continued)

FOREIGN PATENT DOCUMENTS

| | | |
|---|---|---|
| JP | 2018095153 A | 6/2018 |
| JP | 20180127039 A | 8/2018 |

(Continued)

OTHER PUBLICATIONS

International Search Report for Application No. PCT/US2020/032205, dated Aug. 13, 2020, 14 pages.

(Continued)

*Primary Examiner* — Jason K Niesz
(74) *Attorney, Agent, or Firm* — Barnes & Thornburg LLP (57) ABSTRACT

A capless filler pipe closure is provided for a tank filler pipe. The capless closure permits a fuel pump nozzle to be inserted into the tank filler pipe without first removing a fuel cap from the outer end of the tank filler pipe.

17 Claims, 7 Drawing Sheets

(56) References Cited

U.S. PATENT DOCUMENTS

| | | | |
|---|---|---|---|
| 7,882,862 B2 * | 2/2011 | DeCapua | B60K 15/035 |
| | | | 141/295 |
| 9,266,428 B2 | 2/2016 | Kobayashi | |
| 10,000,117 B2 ‡ | 6/2018 | Giles | G01F 9/001 |
| 10,065,496 B2 ‡ | 9/2018 | Frank | B60K 15/04 |
| 10,226,996 B2 ‡ | 3/2019 | Giles | B60K 15/04 |
| 2005/0155671 A1 | 7/2005 | McClung et al. | |
| 2013/0213963 A1 ‡ | 8/2013 | Chretien | B67D 7/06 |
| | | | 220/86.2 |
| 2014/0096835 A1 | 4/2014 | Yager et al. | |
| 2014/0346171 A1 ‡ | 11/2014 | Yamamoto | B60K 15/05 |
| | | | 220/86 |
| 2015/0001215 A1 | 1/2015 | Kito et al. | |
| 2015/0048087 A1 ‡ | 2/2015 | Hagano | F16K 1/50 |
| | | | 220/86 |
| 2016/0009173 A1 ‡ | 1/2016 | Sperando | B60K 15/05 |
| | | | 220/86 |
| 2016/0048087 A1 ‡ | 2/2016 | Yang | G03F 7/707 |
| 2016/0311316 A1 | 10/2016 | Kerstein | |
| 2017/0072790 A1 ‡ | 3/2017 | Frank | B60K 15/04 |
| 2017/0158048 A1 ‡ | 6/2017 | Giles | B60K 15/04 |
| 2019/0023125 A1 ‡ | 1/2019 | Costa | B60K 15/04 |
| 2019/0352173 A1 * | 11/2019 | Hirohara | B60K 15/04 |

FOREIGN PATENT DOCUMENTS

| | | | |
|---|---|---|---|
| KR | 2019990003290 U | ‡ | 1/1999 |
| KR | 2019990003290 U | | 1/1999 |

OTHER PUBLICATIONS

PCT International Search Report and Written Opinion completed by the ISA/KR dated Aug. 3, 2003 and issued in connection with PCT/US2020/032209.

PCT International Search Report and Written Opinion completed by the ISA/KR dated Aug. 25, 2020 and issued in connection with PCT/US2020/032204.

\* cited by examiner
‡ imported from a related application

CAPLESS CLOSURE ASSEMBLY FOR FUEL-TANK FILLER PIPE

PRIORITY CLAIM

This application is a continuation-in-part of U.S. application Ser. No. 16/514,037 filed Jul. 17, 2019, which claims priority under 35 U.S.C. § 119(e) to U.S. Provisional Application No. 62/847,499, filed May 14, 2019, each of which is expressly incorporated by reference herein.

BACKGROUND

The present disclosure relates to a filler pipe closure for a tank filler pipe. More particularly, the present disclosure relates to a capless closure that permits a fuel-dispensing pump nozzle to he inserted into a tank filler pipe to supply fuel to a fuel tank and closes the tank filler pipe when the fuel-dispensing pump nozzle is removed from the closure.

Many vehicles include a fuel tank, a fuel-tank filler pipe coupled to the fuel tank to communicate liquid fuel from a fuel-dispensing pump nozzle to the fuel tank, and a closure coupled to the fuel-tank filler pipe to seal the fuel-tank filler pipe. During refueling, the fuel-dispensing pump nozzle is passed by a user first through an outer chamber associated with an outer end of the fuel-tank filler pipe that is open to the atmosphere and then through a nozzle-receiving aperture into a fuel-conducting passageway formed in the fuel-tank filler pipe. Then the pump nozzle is actuated by the user to cause liquid fuel discharged by the pump nozzle to flow through the fuel-conducting passageway into the fuel tank.

SUMMARY

According to the present disclosure, a fuel-tank filler apparatus comprises a filler pipe closure that is adapted to be coupled to a fuel-tank fuel filler pipe. In illustrative embodiments, the filler pipe closure is a capless system that includes a nozzle-insertion housing that is configured to mate with an outer end of a fuel filler pipe to provide a fill tube that leads to a vehicle fuel tank. The nozzle-insertion housing is formed to include an outer chamber and an inner nozzle-receiving aperture that is located to interconnect the outer chamber in fluid communication with an inner chamber that communicates with a fuel-conducting passageway formed in the fuel filler pipe when the nozzle-insertion housing is mated with the outer end of the fuel filler pipe.

In illustrative embodiments, the filler pipe closure further includes two flapper doors that are each pivotably mounted on an associated door-support pin included in the nozzle-insertion housing. Each flapper door is arranged to be moved relative to the nozzle-insertion housing by the tip of a fuel-dispensing pump nozzle moved in the nozzle-insertion housing by a user to open and close one of the two nozzles insertion apertures formed in the nozzle-insertion housing. The filler pipe closure further includes a door-closing spring for each of the pivotable flapper doors. Each door-closing spring is mounted on a spring-support pin that is included in the nozzle-insertion housing and separated from its companion door-support pin.

In illustrative embodiments, the filler pipe closure further includes a spring-biased nozzle-actuated outer flapper door mounted on the nozzle-insertion housing for movement relative to the nozzle-insertion housing between a closed position closing an outer nozzle-receiving aperture formed in the nozzle-insertion housing and an opened position opening that outer nozzle-receiving aperture. During refueling, the tip of a fuel-dispensing pump nozzle is moved by a user to engage the normally closed outer flapper door and move the outer flapper door against a closing force applied by a companion spring to assume the opened position. The nozzle tip is then passed through the outer chamber and the inner nozzle-receiving aperture to open the spring-biased nozzle-actuated outer flapper door associated with the outer chamber of the nozzle-insertion housing. The nozzle tip is then moved past the inner flapper door into the inner chamber that communicates with the fuel-conducting passageway formed in the fuel filler pipe. The pump nozzle may then be actuated by the user to dispense fuel into the fuel-conducting passageway that leads to the fuel tank.

In illustrative embodiments, the outer flapper door is mounted on an outer door-support pin included in the nozzle-insertion housing for pivotable movement between the closed and opened positions about an outer door-pivot axis associated with the outer door-support pin. The outer door-closing spring is mounted on a separate outer spring-support pin also included in the nozzle-insertion housing. The outer door-closing spring is arranged to act against the nozzle-insertion housing to urge the outer flapper door to pivot about the outer door-pivot axis associated with the outer door-support pin normally to assume the closed position. The outer spring-support pin of the nozzle-insertion housing is arranged to lie in spaced-apart parallel relation to the outer door-support pin.

In illustrative embodiments, the filler pipe closure further includes a spring-biased nozzle-actuated inner flapper door mounted on the nozzle-insertion housing for movement relative to the nozzle-insertion housing between a closed position closing the inner nozzle-receiving aperture formed in the nozzle-insertion housing and an opened position opening that inner nozzle-receiving aperture. The tip of the fuel-dispensing nozzle can be moved by a user through the outer chamber of the nozzle-insertion housing during tank refueling to pivot the inner flapper door against a closing force applied by the companion door-closing spring to open the inner flapper door.

In illustrative embodiments, the inner flapper door is mounted on an inner door-support pin included in the nozzle-insertion housing for pivotable movement between the closed and opened positions about an inner door-pivot axis associated with the inner door-support pin. The filler pipe closure further includes an inner door-closing spring mounted on a separate inner spring-support pin also included in the nozzle-insertion housing. The inner door-closing spring is arranged to act against the nozzle-insertion housing to yieldably urge the inner flapper door to pivot about the inner door-pivot axis associated with the inner door-support pin normally to assume the closed position. The inner door-support pin is arranged to lie between the outer flapper door and the inner spring-support pin.

In illustrative embodiments, each of the outer and inner door-closing springs is a torsion spring comprising a helically wound energy-storage unit, a short leg coupled to the companion helically wound energy-storage unit and arranged to engage the nozzle-insertion housing, and one or more relatively longer long legs coupled to the companion helically wound energy-storage unit and arranged to engage either the outer flapper door or the inner flapper door. The companion spring-support pin is arranged to extend through a pin-receiving channel formed in the companion helically wound energy-storage unit to support the companion door-closing spring to apply a yieldable door-closing force to the companion outer or inner flapper door and to locate the companion helically wound energy-storage unit of the torsion spring in spaced-apart relation to the companion outer or inner flapper door.

Additional features of the present disclosure will become apparent to those skilled in the art upon consideration of the following detailed description of illustrative embodiments exemplifying the best mode of carrying out the present disclosure as presently perceived.

BRIEF DESCRIPTION OF THE DRAWINGS

The detailed description particularly refers to the accompanying figures in which:

FIG. 3 is a sectional view taken along line 3-3 of FIG. 1 of a fuel-tank filler apparatus in accordance with the present disclosure showing an illustrative nozzle-insertion housing mounted in the outer end of a fuel filler pipe, and showing that the capless filler pipe closure further includes a spring-loaded nozzle-actuated outer flapper door located in an outer end of the nozzle-insertion housing and yieldably biased to assume a closed position closing an outer nozzle-receiving aperture formed in the nozzle-insertion housing, a spring-loaded inner flapper door yieldably biased to assume a closed position closing an inner nozzle-receiving aperture formed in a middle section of the nozzle-insertion housing and arranged to lie in spaced-apart relation to the outer flapper door to define an outer chamber of the nozzle-insertion housing, and an overflow-capture-and-drainage system configured in accordance with the present disclosure to conduct any overflow liquid fuel extant in an inner chamber formed in the nozzle-insertion housing into one or more overflow reservoirs for gravity discharge through one or more drain holes formed in a lower portion of the nozzle-insertion housing into a fuel-conducting passageway formed in the fuel filler pipe for delivery to the fuel tank near the end of a tank-refueling activity;

FIG. 3A is an enlarged view of FIG. 3 showing that (1) an outer spring-support pin used to support an outer door-closing torsion spring associated with the outer flapper door is decoupled from an outer door-support pin that establishes an outer door-pivot axis of the pivotable outer flapper door to locate the outer spring-support pin between the outer door-support pin and the inner flapper door, (2) an inner spring-support pin used to support an inner door-closing torsion spring associated with the inner flapper door is decoupled from an inner door-support pin that establishes an inner door-pivot axis of the pivotable inner flapper door to locate the inner door-support pin of the pivotable inner flapper door between the outer door-support pin associated with the pivotable outer flapper door and the inner spring-support pin associated with the inner flapper door, (3) an outer section of the nozzle-insertion housing is formed to include a center portion, a rim portion arranged to surround the center portion and trap an outer end of the fuel filler pipe therebetween, and a series of frangible circumferentially spaced-apart break-away segments coupled at one end to the center portion and at another end to the rim portion, (4) a laser weld is used to join the center portion of the outer section of the nozzle-insertion housing to an inner section of the nozzle-insertion housing that is used to support the pivotable inner flapper door, and (5) the liquid-fuel overflow-capture-and-drainage system is arranged and configured to manage collection and drainage of any liquid fuel that is collected in one or more overflow reservoirs provided in the inner chamber of the nozzle-insertion housing;

FIG. 3B is an exploded assembly view of the component shown in FIG. 3A showing that each of the outer and inner flapper doors is mounted for pivotable movement on a door-support pin that is separate and spaced-apart from the spring-support pin that supports the companion door-closing torsion spring and suggesting that (1) outer and middle sections of the nozzle-insertion housing cooperate with the spring-loaded outer flapper door to form an outer module of the filler pipe closure, (2) an inner section of the nozzle-insertion housing cooperates with the spring-loaded inner flapper door to form an inner module of the filler pipe closure, and (3) an overflow-capture-and-drainage system of the filler pipe closure is arranged to lie under the inner and outer modules when the components are assembled as shown in FIG. 3A;

FIG. 4 is a perspective view of the underside of the spring-biased inner flapper door of FIG. 3 suggesting that the inner door-closing spring associated with the pivotable inner flapper door is separated from the companion inner door-support pin on which the pivotable inner flapper door is mounted and showing that the inner door-closing spring includes a helically wound energy-storage unit comprising sixteen coils mounted on the inner spring-support pin, a relatively short first leg coupled to a middle portion of the helically wound energy-storage unit and arranged to engage the nozzle-insertion housing, and a pair of relatively longer second legs coupled to outer portions of the helically wound energy-storage unit and arranged to engage the underside of the inner flapper door to apply a door-closing force to the inner flapper door;

DETAILED DESCRIPTION

Figure 1:
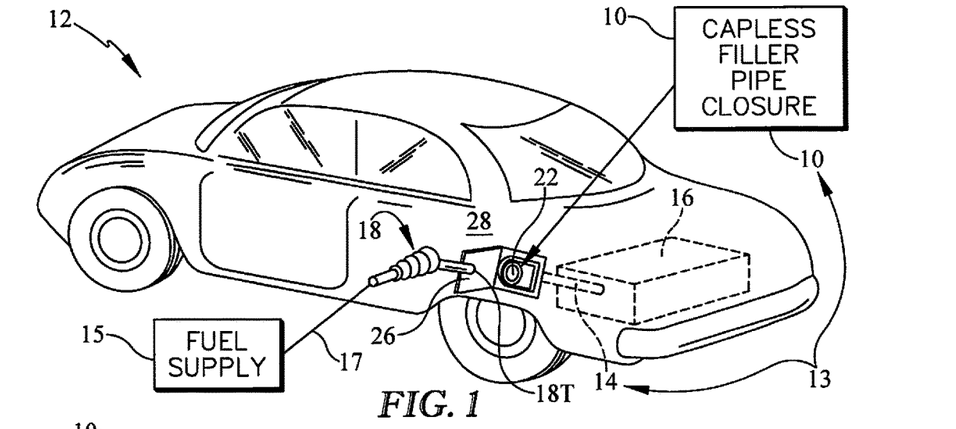
FIG. 1 is a perspective view showing an outer filler-pipe access door moved to an opened position relative to a vehicle body panel to expose an illustrative capless filler pipe closure that is coupled to a fuel filler pipe leading to a vehicle fuel tank and showing a fuel-dispensing pump nozzle that is coupled to a fuel supply and configured to be inserted into the capless filler pipe closure during vehicle refueling to discharge liquid fuel into the fuel filler pipe leading to the vehicle fuel tank.

A capless filler pipe closure 10 is provided in a vehicle 12 to close a fuel filler pipe 14 extending from a fuel tank 16 onboard vehicle 12 and to accept a fuel-dispensing pump nozzle 18 during fuel tank refueling as suggested in FIG. 1. Filler pipe closure 10 cooperates with fuel filler pipe 14 to define a fill tube 13 for conducting liquid fuel from nozzle 18 to fuel tank 16. Pump nozzle 18 is coupled to a fuel supply 15 by a hose 17.

Capless filler pipe closure 10 is configured to close off fuel filler pipe 14 from the atmosphere until fuel-dispensing pump nozzle 18 is inserted into closure 10. Filler pipe closure 10 includes a nozzle-insertion housing 20 coupled to an outer end of fuel filler pipe 14 as suggested in FIGS. 2 and 3. Nozzle-insertion housing 20 is formed to include a passageway 20P that extends in an outer chamber 20I of nozzle-insertion housing 20 from an outer nozzle-receiving aperture 20OA to an inner nozzle-receiving aperture 20IA as suggested in FIGS. 3, 3A, and 3B. During fuel tank refueling, a user inserts the fuel-dispensing pump nozzle 18 into passageway 20P in nozzle-insertion housing 20 until a distal tip 18T of nozzle 18 extends into an inner chamber 20I of nozzle-insertion housing 20 and communicates with a fuel-conducting passageway 15 formed in fuel filler pipe 14 to transfer fuel discharged by nozzle 18 to fuel tank 16 through fuel filler pipe 14.

Figures 2, 3:
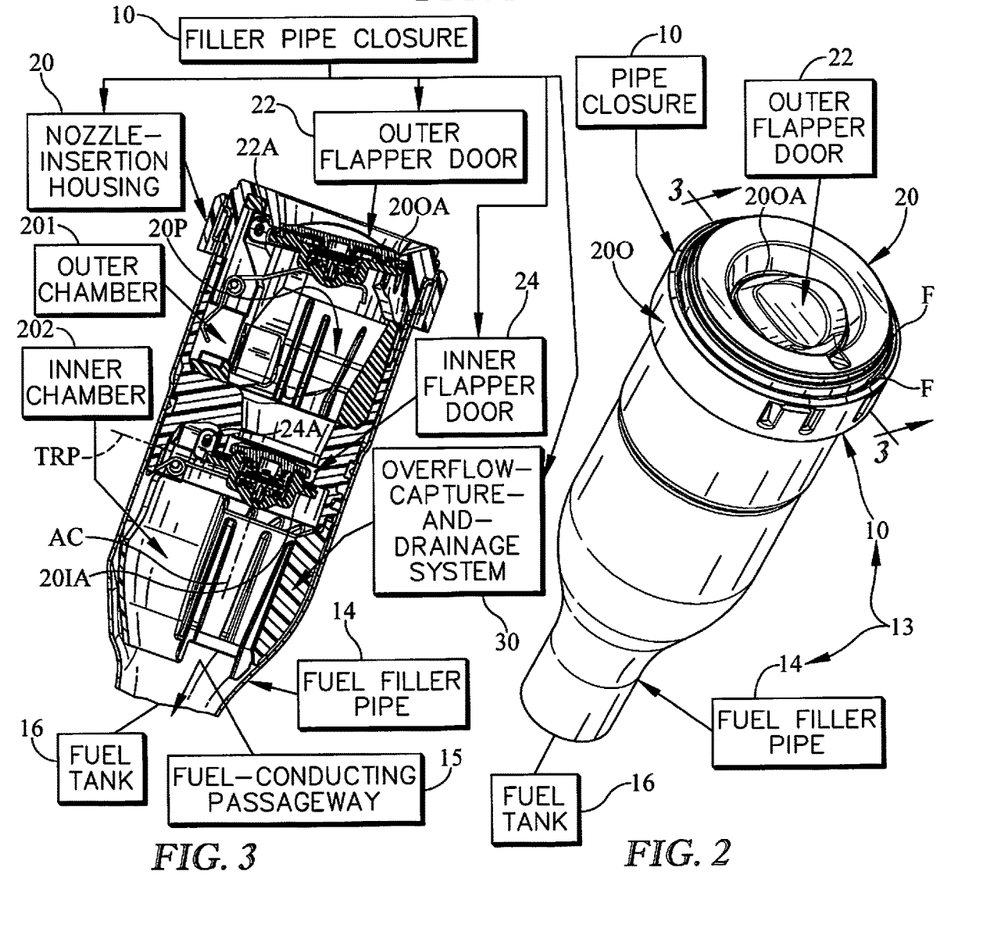
FIG. 2 is an enlarged perspective view of the capless filler pipe closure of FIG. 1 coupled to the fuel filler pipe to provide a fill tube for a fuel tank and showing an exposed portion of a nozzle-insertion housing that is coupled to an outer end of the fuel filler pipe and formed to include an outer nozzle-receiving aperture and also showing a pivotable outer flapper door closing the outer nozzle-receiving aperture.

Filler pipe closure 10 also includes outer and inner flapper doors 22, 24 located inside nozzle-insertion housing 20 along nozzle-receiving passageway 20P as suggested in FIG. 3. A spring-loaded outer flapper door 22 is mounted on a middle section 20M of nozzle-insertion housing 20 as suggested in FIGS. 3A and 3B for pivotable movement on an outer door-support pin 22P about an outer door-pivot axis 22A when engaged by the tip 18T of a moving fuel-dispensing pump nozzle 18. A spring-loaded inner flapper door 24 is mounted on an inner section 20I of nozzle-insertion housing 20 as suggested in FIG. 3A for pivotable movement on an inner door-support pin 24P about an inner door-pivot axis 24A when engaged by the moving nozzle tip 18T.

Figure 3A:
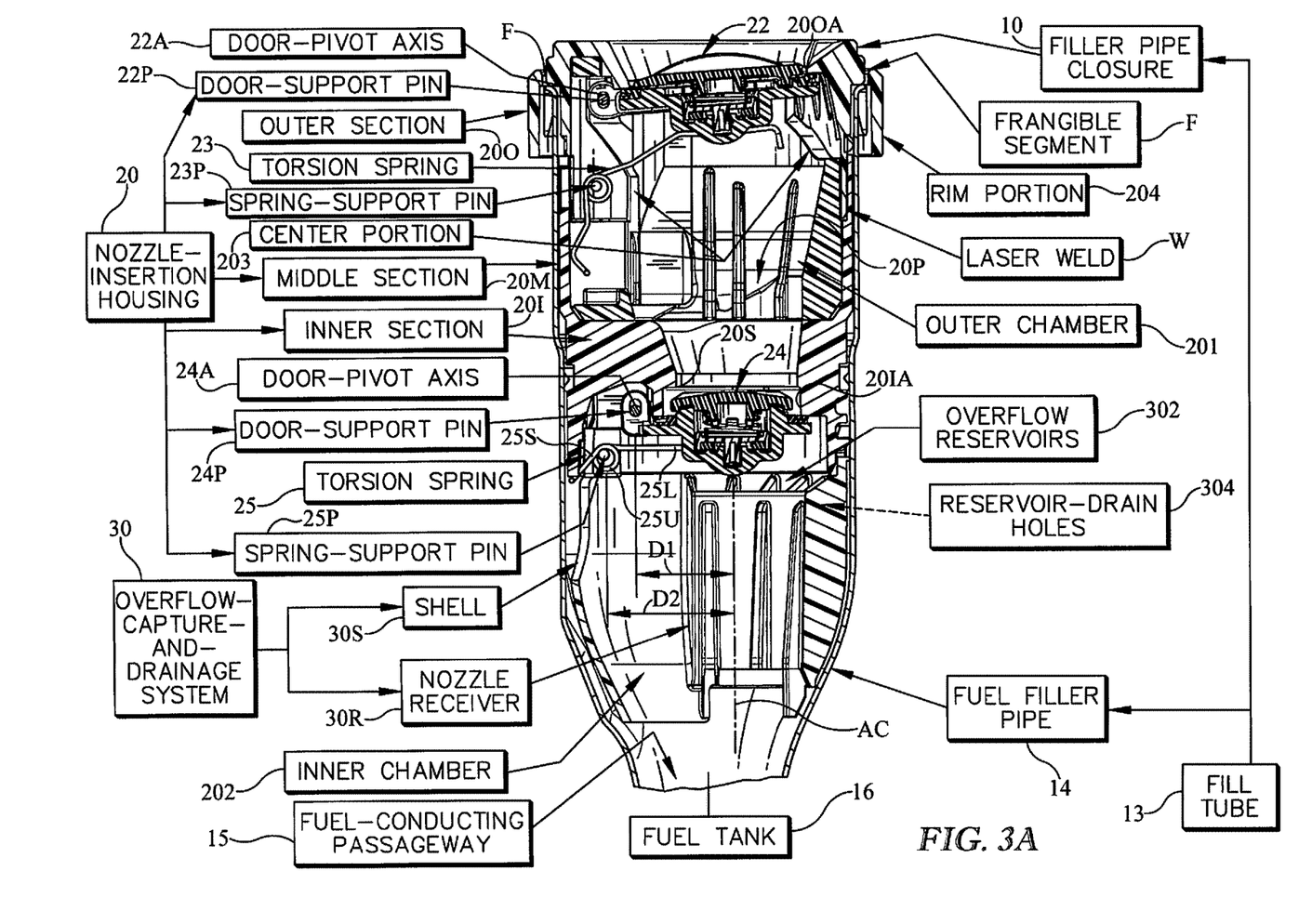

Filler pipe closure 10 also includes an outer torsion spring 23 arranged normally to close outer flapper door 22 and an inner torsion spring 25 arranged normally to close inner flapper door 24 as shown, for example, in FIGS. 3 and 3A. Outer torsion spring 23 is mounted on an outer spring-support pin 23P that is arranged to lie in spaced-apart relation to the outer door-support pin 22P on which outer flapper door 22 is mounted for pivotable movement between opened and closed positions as shown in FIG. 3A. Inner torsion spring 25 is mounted on an inner spring-support pin 25P that is arranged to lie in spaced-apart relation to the inner door-support pin 24P on which inner flapper door 24 is mounted for pivotable movement between opened and closed positions as shown in FIG. 3A.

Figure 3B:
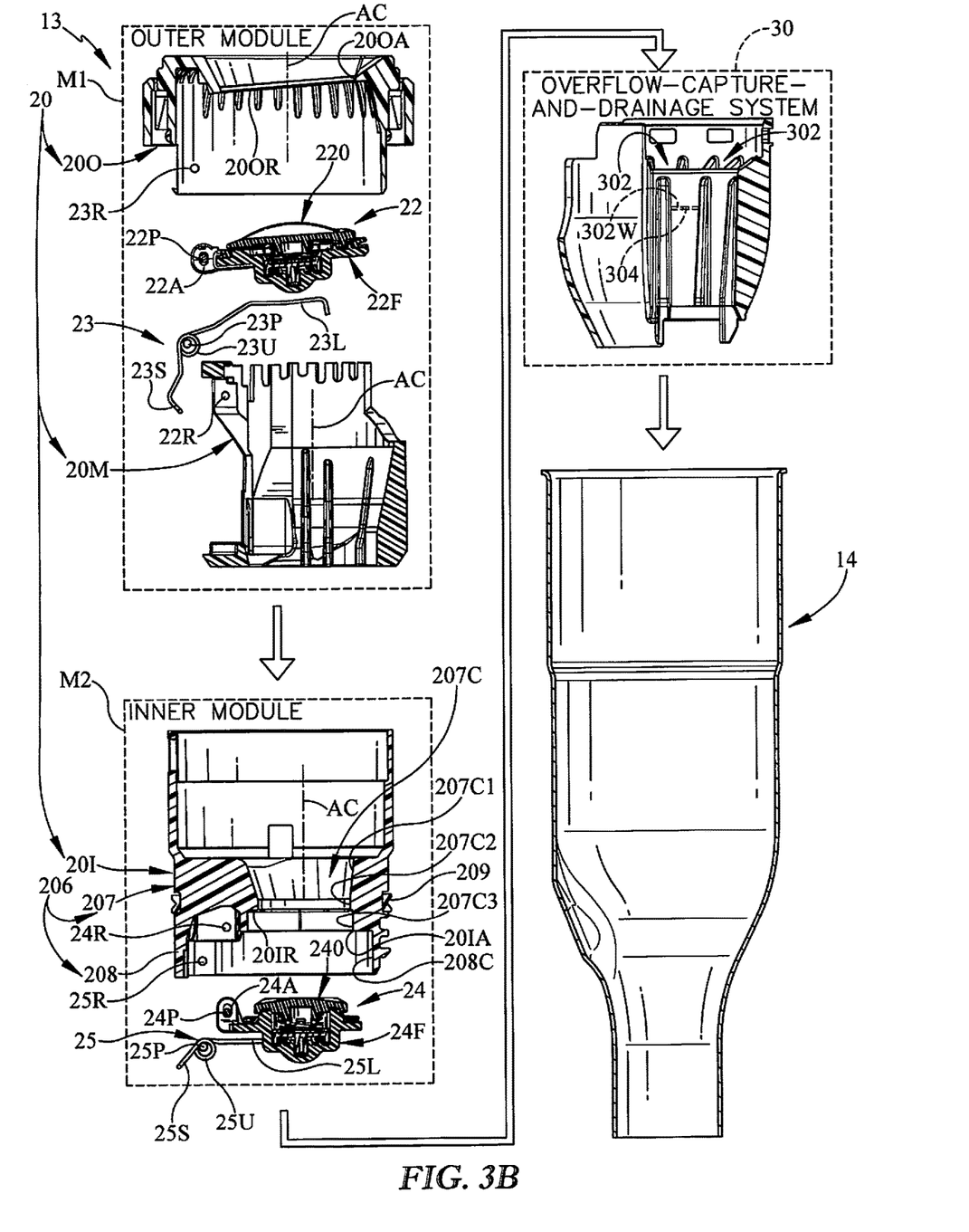

Nozzle-insertion housing 20 includes an outer section 20O, a middle section 20M, and an inner section 20I as shown, for example in FIGS. 3A and 3B. An outer section 20O of nozzle-insertion housing 20 is visible to an observer as seen in FIG. 2. Outer section 20O is arranged to lie in axially spaced-apart relation to inner section 20I to locate middle section 20M between inner and outer sections 20I, 20O as suggested in FIGS. 3, 3A, and 3B. Outer section 20O is formed to include a pin receiver 23R for receiving outer spring-support pin 23P as suggested in FIG. 3B. Middle section 20M is formed to include a pin receiver 22R for receiving outer door-support pin 22P as suggested in FIG. 3B. Inner section 20I is formed to include pin receivers 24R, 25R for receiving, respectively, inner door-support pin 24P and inner spring-support pin 25P as suggested in FIG. 3B.

Capless filler pipe closure 10 of fill tube 13 is exposed to receive a tip 18T of fuel-dispensing pump nozzle 18 during vehicle tank refueling as suggested in FIG. 1. An access door 26 is mounted for pivotable movement relative to a body panel 28 of vehicle 12 to an opened position as suggested in FIG. 1 to expose an outer flapper door 22 and provide access to capless filler pipe closure 10 during tank refueling activities.

Nozzle-insertion housing 20 also includes an outer door-support pin 22P that is configured to extend into a pin receiver 22R formed in middle section 20M of nozzle-insertion housing 20 as suggested in FIGS. 3A and 3B to support outer flapper door 22 for pivotable movement about an outer door-pivot axis 22A between opened and closed positions. In the closed position, outer flapper door 22 mates with an axially inwardly facing annular rim 20O to form a boundary of outer nozzle-receiving aperture 20OA included in outer section 20O as suggested in FIGS. 3A on 3B.

Nozzle-insertion housing 20 also includes an inner door-support pin 24P that is configured to extend into a pin receiver 24R formed in inner section 20I of nozzle-insertion housing 20 as suggested in FIGS. 3A and 3B to support inner flapper door 24 for pivotable movement about an inner door-pivot axis 24A between opened and closed positions. In the position, inner flapper door 24 mates with an axially inwardly facing annular rim 20IR included in middle section 20M to form a boundary of inner nozzle-receiving aperture 20IA as suggested in FIGS. 3A and 3B.

Filler pipe closure 10 also includes an outer door-closing spring 23 for yieldably pivoting outer flapper door 22 about outer door-pivot axis 22A normally to assume the closed position. Filler pipe closure 10 also includes an inner door-closing spring 25 for yieldably pivoting inner flapper door 24 about inner door-pivot axis 24A normally to assume the closed position.

Outer door-closing spring 23 is mounted on an outer spring-support pin 23P that is located in spaced-apart relation to outer door-support pin 22P as suggested in FIGS. 3A and 3B. An outer spring-support pin 23P used to support an outer torsion spring 22 associated with outer flapper door 22 is decoupled from door-pivot axis 22A of the pivotable outer flapper door 22. Such decoupling locates outer spring-support pin 23P between the door-pivot axis 22A of the pivotable outer flapper door 22 and the spring-support pin 25P associated with the inner flapper door 24 as shown in FIG. 3A. Outer spring-support pin 23P is configured to extend into a pin receiver 23R formed in outer section 20O of nozzle-insertion housing 20 as suggested in FIGS. 3A and 3B. Outer door-closing spring 23 is arranged to engage a portion of outer flapper door 22 as suggested in FIG. 3A.

Figure 6:
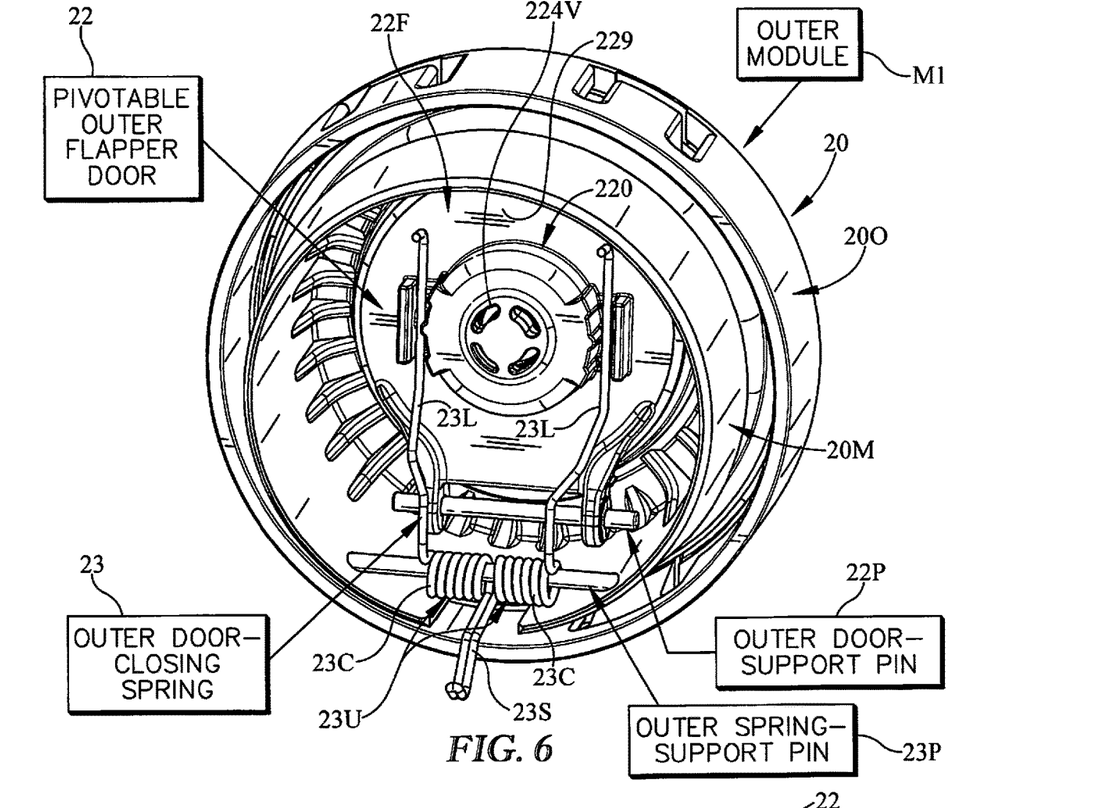
FIG. 6 is a perspective view of the underside of the spring-biased outer flapper door of FIG. 3 suggesting that the outer door-closing spring associated with the pivotable outer flapper door is separated from the companion outer door-support pin on which the pivotable outer flapper door is mounted and showing that the outer door-closing spring includes a helically wound energy-storage unit comprising twelve coils mounted on the outer spring-support pin associated with the pivotable outer flapper door.

Outer door-closing spring 23 is a torsion spring comprising a helically wound energy-storage unit 23U, a short leg 23S coupled to the helically wound energy-storage unit 23U and arranged to engage nozzle-insertion housing 20, and a pair of relatively longer long legs 23L coupled to the helically wound energy-storage unit 23U and arranged to engage outer flapper door 22 as suggested in FIG. 6. Spring-support pin 22P is arranged to extend through a pin-receiving channel formed in the helically wound energy-storage unit 23U as suggested in FIGS. 3A and 6 to support door-closing spring 23 to apply a yieldable door-closing force to inner flapper door 22 and to locate the helically wound energy-storage unit 23U of outer torsion spring 23 in spaced-apart relation to outer flapper door 22 as suggested in FIGS. 3A and 6.

The helically wound energy-storage unit 23U of outer door-closing spring 23 comprises twelve coils 23C arranged to form two separate groups of six coils 23C separated by the short leg 23S of outer door-closing spring 23 as shown, for example, in FIG. 6. Mounting outer door-closing spring 23 on an outer spring-support pin 23P that is separated from the outer door-support pin 22P on which the pivotable outer door flap 22 is mounted provides more space to hold extra coils 23C in accordance with the present disclosure as suggested in FIG. 6.

Inner door-closing spring 25 is mounted on an inner spring-support pin 25P that is located in spaced-apart relation to inner door-support pin 24P as suggested in FIGS. 3A and 3B. An inner spring-support pin 25 used to support a torsion spring 25 associated with inner flapper door 24 is decoupled from inner door-pivot axis 24A of the pivotable inner flapper door 24. Such decoupling locates the inner door-pivot axis 24A of the pivotable inner flapper door 24 between the outer door-pivot axis 22A of the pivotable outer flapper door 22 and the inner spring-support pin 25P associated with the inner flapper door 24 as shown in FIG. 3A. Inner spring-support pin 25P is configured to extend into a pin receiver 25R formed in inner section 20I of nozzle-insertion housing 20 as suggested in FIGS. 3A and 3B. Inner door-closing spring 25 is arranged to engage a portion of inner flapper door 24A as suggested in FIG. 3A.

Figure 4:
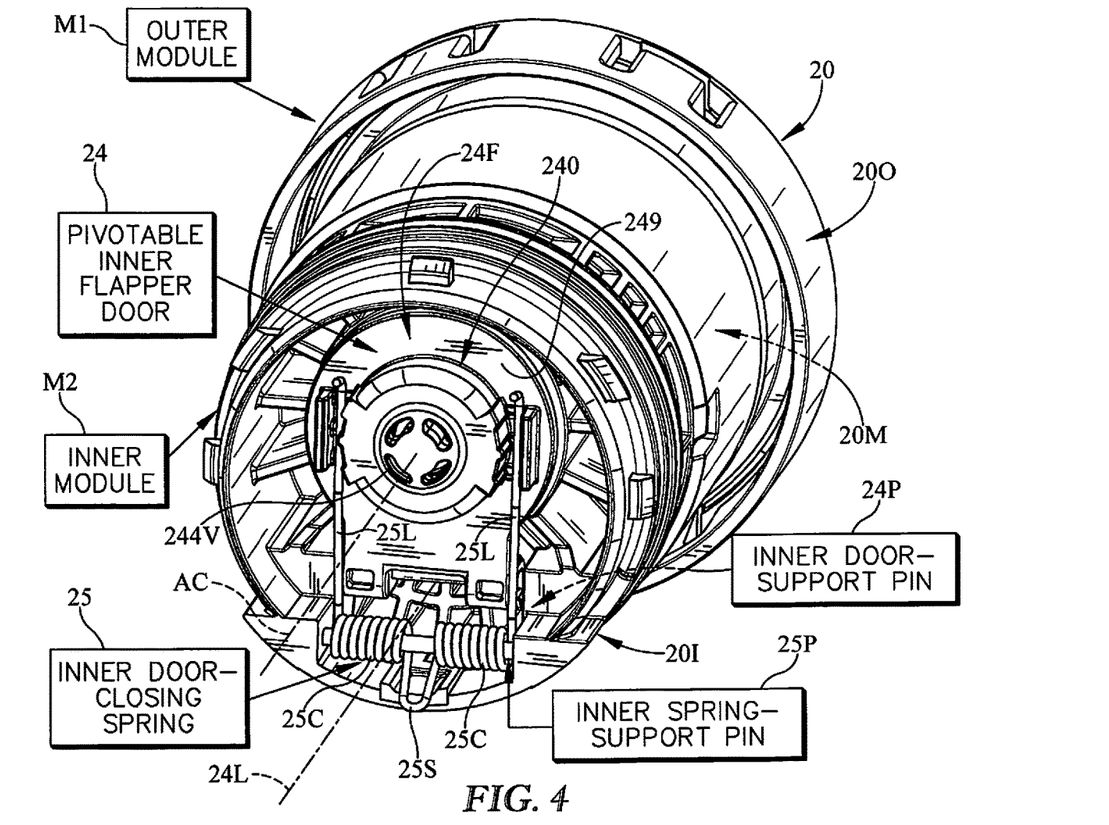

Inner door-closing spring 25 is a torsion spring comprising a helically wound energy-storage unit 25U, a short leg 25S coupled to the helically wound energy-storage unit 25U and arranged to engage nozzle-insertion housing 20, and a pair of relatively longer long legs 25L coupled to the helically wound energy-storage unit 25U and arranged to engage inner flapper door 24 as suggested in FIG. 4. Inner spring-support pin 25P is arranged to extend through a pin-receiving channel formed in the helically wound energy-storage unit 25U as suggested in FIGS. 3A, 3B, and 4 to support door-closing spring 25 to apply a yieldable door-closing force to inner flapper door 24 and to locate the helically wound energy-storage unit 25U of torsion spring 25 in spaced-apart relation to inner flapper door 24 as suggested in FIGS. 3A and 4.

The helically wound energy-storage unit 25U of inner door-closing spring 25 comprises sixteen coils 25C arranged to form two separate groups of eight coils 25C separated by the short leg 25S of inner door-closing spring 25 as shown, for example, in FIG. 4. Mounting inner door-closing spring 25 on an outer spring-support pin 25P that is separated from the inner door-support pin 24P on which the pivotable inner door flap 24 is mounted provides more space to hold extra coils 25C as suggested in FIG. 4.

The spring-loaded nozzle-actuated outer flapper door 22 is located in an outer end of nozzle-insertion housing 20 and yieldably biased to assume a closed position closing an outer nozzle-receiving aperture 20OA formed in nozzle-insertion housing 20 as shown in FIG. 3A. The spring-loaded inner flapper door 24 is yieldably biased to assume a closed position closing an inner nozzle-receiving aperture 20IA formed in a middle section 20M of nozzle-insertion housing 20. Inner flapper door 24 is arranged to lie in spaced-apart relation to outer flapper door 22 to define an outer chamber 201 of nozzle-insertion housing as shown in FIG. 3A.

An overflow-capture-and-drainage system 30 is configured in accordance with the present disclosure to conduct any conduct liquid fuel through an inner chamber 202 formed in nozzle-insertion housing 20 into a fuel-conducting passageway 15 formed in fuel filler pipe 14 for delivery to fuel tank 16. The overflow-capture-and-drainage system 30 is formed as suggested in FIGS. 3A and 3B to include several top-opening overflow reservoirs 302 that will surround in part a pump nozzle 18 inserted into a nozzle receiver 30R after the nozzle 18 has opened outer and inner flapper doors 22, 24. Each overflow reservoir 302 is bounded, in part, by a bottom wall 302W formed to include a reservoir-drain hole 304 that opens into the fuel-conducting passageway 15 of fuel filler pipe 14. System 30 comprises a shell 30S, a nozzle receiver 30R inside shell 30S, and several overflow reservoirs 302 located between shell 30S and nozzle receiver 30R as shown, for example, in FIGS. 3A and 3B.

An outer section 20O of nozzle-insertion housing 20 is formed to include a center portion 203, a rim portion 204 arranged to surround center portion 203 to trap an outer end of fuel filler pipe 14 therebetween, and a series of frangible circumferentially spaced-apart break-away segments (F) coupled at one end to center portion 203 and at another end to rim portion 204 as suggested in FIGS. 2 and 3A. A laser weld (W) is used to join center portion 203 of the outer section 20O of nozzle-insertion housing 20 to an inner section 20I of the nozzle-insertion housing 20 that is used to support the pivotable inner flapper door 24.

An exploded assembly view of the component shown in FIG. 3A is provided in FIG. 3B to suggest that outer and middle sections 20O, 20M of the nozzle-insertion housing 20 cooperate with a spring-loaded outer flapper door 22 to form an outer module M1 of filler pipe closure 10. An inner section 20I of nozzle-insertion housing 20 cooperates with a spring-loaded inner flapper door 24 to form an inner module M2 of filler pipe closure 10 as suggested in FIG. 3B.

An underside of the spring-biased inner flapper door 24 is illustrated in FIG. 4 to reveal that the inner door-closing spring 25 associated with the pivotable inner flapper door 24 includes a helically wound energy-storage unit 25U comprising sixteen coils 25C mounted on an inner spring-support pin 25P, a relatively short first leg 25S coupled to a middle portion of the helically wound energy-storage unit 25U and arranged to engage the nozzle-insertion housing 20, and a pair of relatively longer second legs 20L coupled to outer portions of the helically wound energy-storage unit 25U and arranged to engage the inner flapper door 24 to apply a door-closing force to the inner flapper door 24.

The spring-biased outer flapper door 22 is illustrated in FIS. 6 to reveal that the outer door-closing spring 23 associated with the pivotable outer flapper door 22 includes a helically wound energy-storage unit 23U comprising twelve coils 23C mounted on an door-support pin 22P for the pivotable outer flapper door 22. Outer door-closing spring 23 also includes a relatively short first leg 23S and a pair of relatively longer second legs 23L as shown in FIG. 6.

Figure 5:
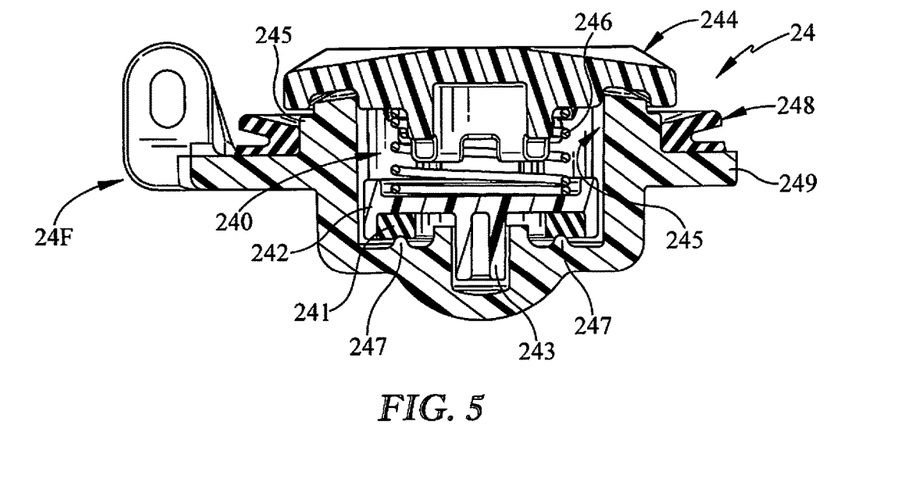
FIG. 5 is an enlarged sectional view of the inner flapper door shown in FIG. 4 to illustrate that such door includes a pivotable frame configured to be mounted for pivotable movement on the inner door-support pin shown in FIG. 3A, a spring-loaded pressure-relief valve mating with the underlying pivotable frame and comprising a downwardly facing overmolded sealing ring carried on a ring-support disk, a downwardly extending valve stem coupled to an underside of the ring-support disk, and a snap-on spring-support base above the ring-support disk that is configured to snap-onto an upwardly extending base-mount ring included in the pivotable frame of the inner flapper door.
Figure 5A:
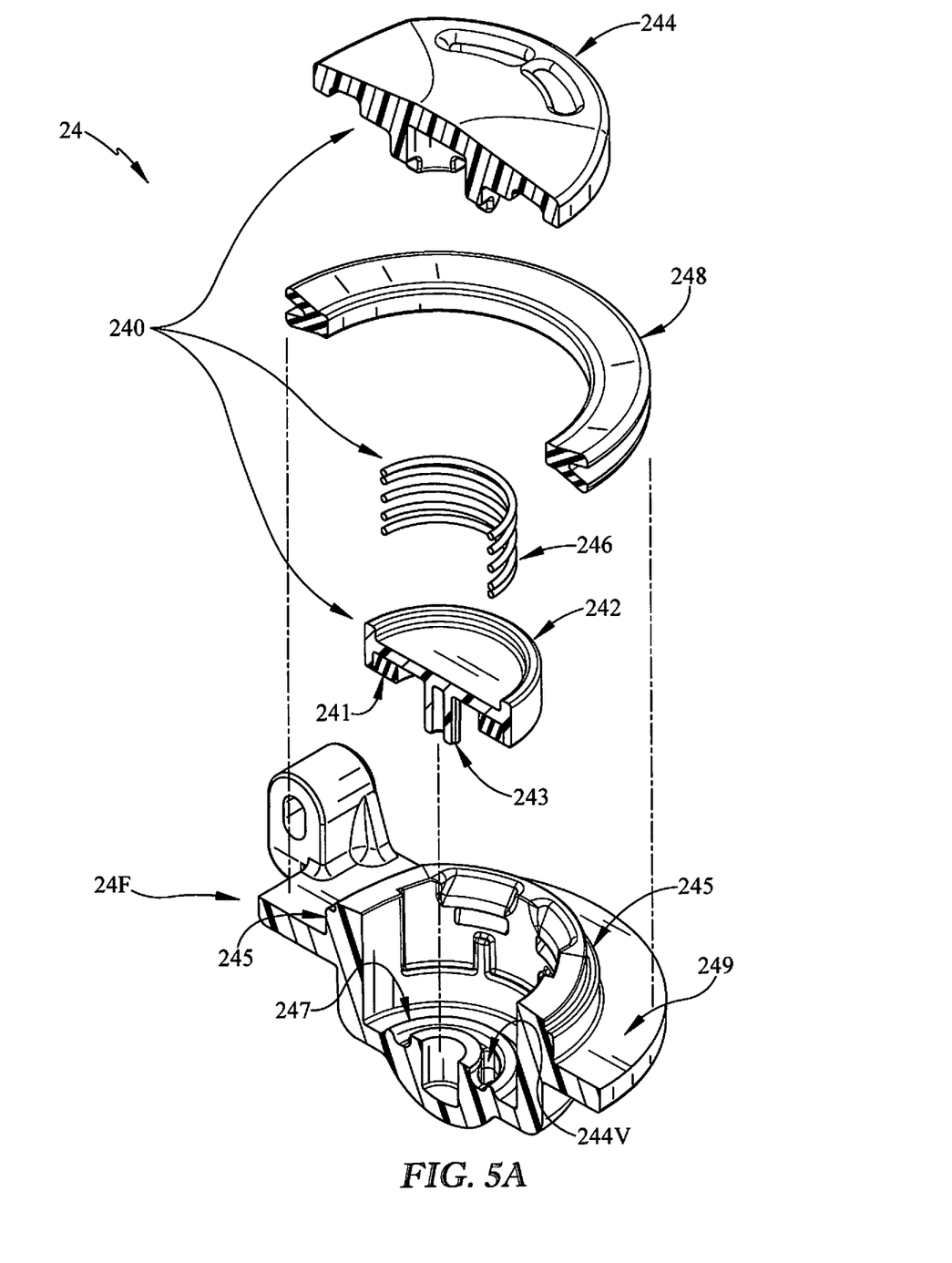
FIG. 5A is an exploded assembly view of the components that cooperate to form the inner flapper door shown in FIG. 5.

An enlarged sectional view of the inner flapper door 24 is provided in FIG. 5 to illustrate that inner flapper door 24 includes a pivotable frame 24F and spring-loaded pressure-relief valve 240 comprising a downwardly facing overmolded sealing ring 241 carried on a ring-support disk 242, a downwardly extending valve stem 242 coupled to an underside of ring-support disk 242, and a snap-on, spring-support base 244 above ring-support disk 242. Spring-support base 244 is formed to include four pressure-relief vent apertures 244V as shown in FIG. 4. The snap-on, spring-support base 244 is configured to snap onto an upwardly extending base-mount ring 245 included in pivotable frame 24F of inner flapper door 24. Inner flapper door 24 also includes an O-ring 248 that is arranged to surround base-mount ring 245 and rest on an annular plate 249 included in the pivotable frame 24F and arranged to extend radially outwardly from base-mount ring 245 as shown in FIG. 5. A coiled compression spring 246 included in pressure-relief valve 240 acts between spring-support base 244 and disk 242 to yieldably urge sealing ring 241 to engage a valve seat 247 as shown in FIG. 5.

Figure 7:
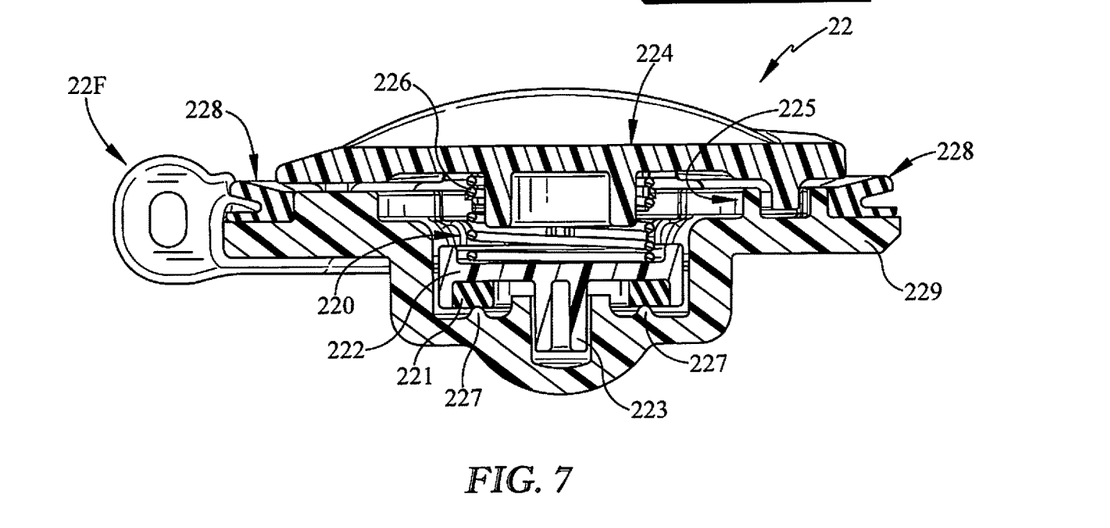
FIG. 7 shows an enlarged sectional view of the outer flapper door shown in FIG. 6 to illustrate that such door includes a pivotable frame configured to be mounted for pivotable movement on the outer door-support pin shown in FIG. 3A, a spring-loaded pressure-relief valve mating with the underlying pivotable frame and comprising a downwardly facing overmolded sealing ring carried on a ring-support disk, a downwardly extending valve stem coupled to an underside of the ring-support disk, and a snap-on spring-support base above the ring-support disk that is configured to snap-onto an upwardly extending base-mount ring included in the pivotable frame of the outer flapper door.
Figure 7A:
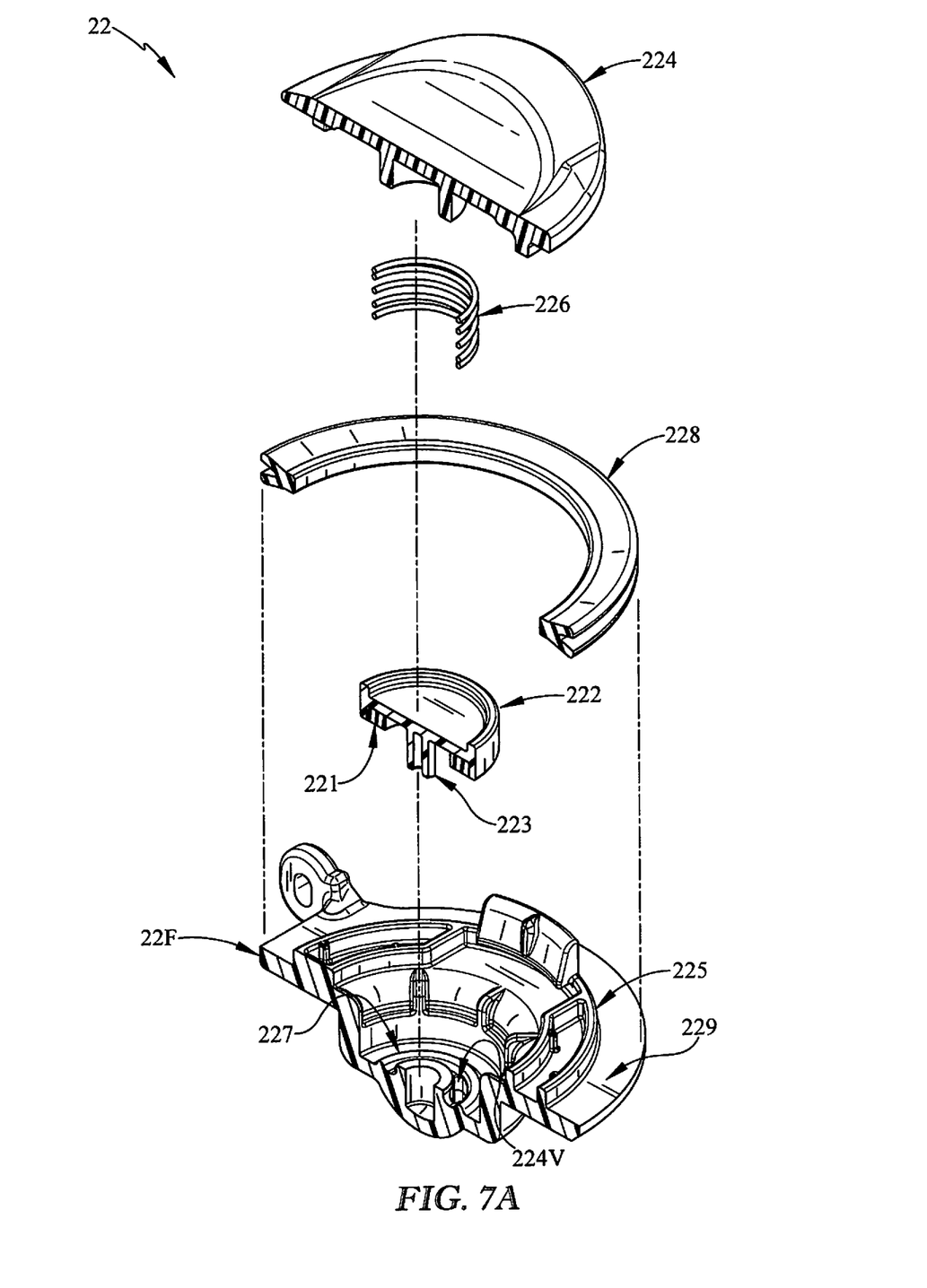
FIG. 7A is an exploded assembly view of the components that cooperate to form the outer flapper door shown in FIG. 7.

An enlarged sectional view of the outer flapper door 22 is provided in FIG. 7 to illustrate that outer flapper door 22 includes a pivotable frame 22F and spring-loaded pressure-relief valve 220 comprising a downwardly facing overmolded sealing ring 221 carried on a ring-support disk 222, a downwardly extending valve stem 223 coupled to an underside of ring-support disk 222, and a snap-on spring-support base 224 above the ring-support disk 222. Spring-support base 224 is formed to include four pressure-relief vent apertures 224V as shown in FIG. 6. The snap-on, spring-support base 224 is configured to snap onto an upwardly extending base-mount ring 225 included in the outer flapper door 22. Outer flapper door 22 also includes an O-ring 228 that is arranged to surround base-mount ring 225 and rest on an annular plate 229 included in the pivotable frame 22F and arranged to extend radially outwardly from base-mount ring 225 as shown in FIG. 5. A coiled compression spring 226 included in pressure-relief valve 220 acts between spring-support base 224 and disk 222 to yieldably urge sealing ring 221 to engage a valve seat 227 as shown in FIG. 7.

A filler pipe closure 10 for a fuel filler pipe 14 associated with a vehicle fuel tank 16 is shown in FIGS. 1 and 2. Filler pipe closure 10 includes a nozzle-insertion housing 20 that is formed to include a nozzle-receiving aperture 20IR and sized to extend into a fuel-conducting passageway 15. Nozzle-insertion housing 20 includes an inner door-support pin 24 and an inner spring-support pin 25 arranged to lie in spaced-apart relation to inner door-support pin 24P. Inner flapper door 24 is mounted on inner door-support pin 24P for pivotable movement relative to nozzle-insertion housing 20 from a closed position closing the inner nozzle-receiving aperture 20IR to an opened position opening the nozzle-receiving aperture 20IR. An inner door-closing spring 25S is mounted on spring-support pin 25P to lie in spaced-apart relation to inner door-support pin 24P and arranged to yieldably urge inner flapper door 24 to the closed position.

Inner door-closing spring 25 includes a helically wound energy-storage unit 25U, a first leg 25S coupled to the helically wound energy-storage unit 25U and arranged to engage nozzle-insertion housing 20, and a second leg 25L coupled to the helically wound energy-storage unit and arranged to engage inner flapper door 24 to apply a door-closing force to inner flapper door 24 normally to pivot inner flapper door 24 about the inner door-support pin 24P to the closed position closing the nozzle-receiving aperture 20IR as suggested in FIGS. 3 And 4. Inner spring-support pin 25P of nozzle-insertion housing 20 is arranged to extend through a pin-receiving channel 25C formed in the helically wound energy-storage unit 25U to locate inner door-closing spring 25S spaced-apart relation to inner door-support pin 24P as suggested in FIGS. 3A and 3B.

Nozzle-insertion housing 20 includes an aperture rim 20IR that is formed to include the nozzle-receiving aperture 20IA as shown in FIG. 3B. Aperture rim 20IR establishes a transverse reference plane TRP that extends through a space provided between inner door-support pin 24P and inner spring-support pin 25P as suggested in FIG. 3 to locate inner door-support pin 24P on one side of the transverse reference plane TRP and to locate inner spring-support pin 25P on an opposite side of the transverse reference plane TRP.

Aperture rim 20IR surrounds an axially extending aperture centerline AC that is normal to the transverse reference plane TRP as suggested in FIG. 3. Nozzle-insertion housing 20 includes an aperture rim 20IR that is formed to include the nozzle-receiving aperture 20IA and is arranged to surround the axially extending aperture centerline AC that extends through the nozzle-receiving aperture 20IA. Inner door-support pin 24P is located a first distance D1 from the axially extending aperture centerline as suggested in FIG. 3A. Inner spring-support pin 25P is located a relatively greater second distance D2 from the axially extending aperture centerline AC as suggested in FIG. 3A.

Inner door-support and spring-support pins 24P, 25P are arranged to lie in spaced-apart parallel relation to one another as suggested in FIG. 3B. The axially extending aperture centerline AC is arranged to lie in spaced-apart parallel relation to a reference line 24L that is perpendicular to inner door-support pin 24P as suggested in FIG. 4.

Nozzle-insertion housing 20 further includes a pin-support member 206 having an outer segment 207 formed to include an nozzle-receiving upstream channel 206C terminating at the nozzle-receiving aperture 20IA and an inner segment 208 formed to include a downstream nozzle-receiving channel 208C and coupled to outer segment 207 to place the upstream and downstream nozzle-receiving channels 206C, 208C in fluid communication with one another via the nozzle-receiving aperture 20IA. An O-ring seal 209 is mounted on an exterior portion of outer segment 207 as shown in FIG. 3B, inner door-support pin 24P is coupled to outer segment 207 of pin-support member 206. Inner spring-support pin 25P is coupled to inner segment 208 of pin-support member 206. Pin-support member 206 is illustratively a monolithic component made of a plastics material molded to include the door-support and spring-support pins 24P, 25P.

Outer segment of pin-support member of nozzle-insertion housing 20 is formed to provide the nozzle-receiving upstream channel 207C with a funnel-shaped nozzle inlet passageway 207C1, a wide-diameter outlet passageway 207C3 opening toward inner flapper door 24 when inner flapper door 24 occupies the closed position, and a relatively narrower narrow-diameter transition passageway 207C2 interconnecting the funnel-shaped nozzle inlet passageway 207C1 and the wide-diameter nozzle outlet 207C2 passageway 206C3 as shown in FIG. 3B. Outer segment 207 of pin-support member 206 includes an internal protrusion having a radially inwardly facing exterior boundary surface that faces toward the axially extending aperture centerline AC and defines a portion of boundary of the funnel-shaped nozzle inlet and narrow-diameter transition passageways 207C1, 207C2 and an axially inwardly facing exterior surface that faces toward inner flapper door 24 and defines a ceiling boundary of the wide-diameter nozzle outlet passageway 207C3. The radially inwardly facing exterior boundary surface and the axially inwardly facing exterior surface meet to establish a hidden leading door edge 205 arranged to minimize damage to inner flapper door 24 during insertion of a fuel-dispensing pump nozzle 18 into the nozzle-receiving aperture 20IA formed in nozzle-insertion housing 20.

Outer segment 207 includes a funnel wall 207F as shown in FIG. 3B. Funnel wall 207F bounds the funnel-shaped nozzle inlet passageway 207C1 to provide means for guiding a tip 18T of the fuel-dispensing pump nozzle 18 away from the door-support pin 24P during insertion of the fuel-dispensing pump nozzle 18 into nozzle-insertion housing 20 through the upstream nozzle-receiving channel 207C1, the nozzle-receiving aperture 20IA, and the downstream nozzle-receiving channel 207C3 so that damaging contact by the fuel-dispensing pump nozzle 18 and inner flapper door 24 is minimized.

Inner door-closing spring 25S comprises an helically wound energy-storage unit 25U. Energy-storage unit 25U comprises several coils 25C mounted on the inner spring-support pin to lie in spaced-apart relation to inner flapper door 24 to provide a separation space between the door-support pin and the energy-storage unit 25U to receive portions of the coils 25C and maximize the number of coils 25C included in the helically wound energy-storage unit 25U.

The invention claimed is:

1. A filler pipe closure for a fuel filler pipe associated with a vehicle fuel tank, the filler pipe closure comprising
a nozzle-insertion housing formed to include a nozzle-receiving aperture and sized to extend into a fuel-conducting passageway, the nozzle-insertion housing including a door-support pin and a spring-support pin arranged to lie in spaced-apart relation to the door-support pin,
a flapper door mounted on the door-support pin for pivotable movement relative to the nozzle-insertion housing from a closed position closing the nozzle-receiving aperture to an opened position opening the nozzle-receiving aperture, and
a door-closing spring mounted on the spring-support pin to lie in spaced-apart relation to the door-support pin and arranged to yieldably urge the flapper door to the closed position,
wherein the door-closing spring includes a helically wound energy-storage unit, a first leg coupled to the helically wound energy-storage unit and arranged to engage the nozzle-insertion housing, and a second leg coupled to the helically wound energy-storage unit and arranged to engage the flapper door to apply a door-closing force to the flapper door normally to pivot the flapper door about the door-support pin to the closed position closing the nozzle-receiving aperture, and wherein the spring-support pin of the nozzle-insertion housing is arranged to extend through a pin-receiving channel formed in the helically wound energy-storage unit to locate the door-closing spring in spaced-apart relation to the door-support pin, and
wherein the flapper door includes a pivotable frame mounted on the door-support pin for pivotable movement about the door-support pin and a spring-loaded pressure-relief valve coupled to the pivotable frame to move therewith and configured to discharge pressurized fuel vapor extant in a vapor-receiving region of the nozzle-insertion housing that is located below the flapper door when the flapper door occupies the closed position and wherein the second leg of the door-closing spring is coupled to the pivotable frame and arranged to lie in the vapor-receiving region when the flapper door occupies the closed position.

2. The filler pipe closure of claim 1, wherein the spring-loaded pressure-relief valve comprises a ring-support disk, a downwardly facing overmolded sealing ring carried on the ring-support disk, a downwardly extending valve stem coupled to an underside of the ring-support disk, a spring-support base located above the ring-support disk and coupled to an upwardly extending base-mount ring included in the pivotable frame of the flapper door, and a compression spring that is arranged to act between the spring-support base and the ring-support disk to yieldably urge the sealing ring to engage an annular valve seat included in the pivotable frame to close a vent aperture formed in the pivotable frame to block discharge of pressurized vapor from the vapor-receiving region of the nozzle-insertion housing through the vent aperture and wherein the sealing ring is arranged to lie between the second leg of the door-closing spring and the spring-support base.

3. A filler pipe closure for a fuel filing pipe associated with a vehicle fuel tank, the filler pipe closure comprising
a nozzle-insertion housing formed to include an outer nozzle-receiving aperture at one end, an inner nozzle-receiving aperture at an opposite end, and a nozzle-receiving passageway interconnecting the outer and inner nozzle-receiving apertures to allow a tip of a fuel-dispensing pump nozzle to extend through the outer nozzle-receiving aperture, the nozzle-receiving passageway, and the inner nozzle-receiving aperture during refueling of the vehicle fuel tank, the nozzle-insertion housing including an outer door-support pin and an outer spring-support pin arranged to be in spaced-apart relation to the outer door support pin,
an inner flapper door mounted on the nozzle-insertion housing for pivotable movement relative to the nozzle-insertion housing from a closed position closing the inner nozzle-receiving aperture to an opened position opening the inner nozzle-receiving aperture,
an outer flapper door mounted on the outer door-support pin for pivotable movement in the nozzle-receiving passageway relative to the nozzle-insertion housing from a closed position closing the nozzle-receiving aperture to an opened position opening the nozzle-receiving aperture, and
an outer door-closing spring mounted on the outer spring-support pin to lie in spaced-apart relation to the outer door-support pin in the nozzle-receiving passageway and arranged to yieldably urge the outer flapper door to the closed position,
wherein the outer door-closing spring includes a helically wound energy-storage unit, a first leg coupled to the helically wound energy-storage unit and arranged to engage the nozzle-insertion housing, and a second leg coupled to the helically wound energy-storage unit and arranged to engage the outer flapper door to apply a door-closing force to the outer flapper door normally to pivot the outer flapper door about the outer door-support pin to the closed position closing the outer nozzle-receiving aperture, and wherein the outer spring-support pin of the nozzle-insertion housing is arranged to extend through a pin-receiving channel formed in the helically wound energy-storage unit to locate the outer door-closing spring in spaced-apart relation to the outer door-support pin, and wherein at least one of the outer flapper door and the inner flapper door includes a pivotable frame mounted on the outer door-support pin or an inner door-support pin, respectively, for pivotable movement about the respective door-support pin and a spring-loaded pressure-relief valve coupled to the pivotable frame to move therewith and configured to discharge pressurized fuel vapor extant in a vapor-receiving region of the nozzle-insertion housing that is located below the respective flapper door when the respective flapper door occupies the closed position and wherein the second leg of the outer door-closing spring and/or an inner door-closing spring is coupled to the pivotable frame and arranged to lie in the vapor-receiving region when the respective flapper door occupies the closed position.

4. The filler pipe closure of claim 3, wherein, the nozzle-insertion housing further includes an inner door-support pin and an inner spring-support pin arranged to lie in spaced-apart relation to the inner door-support pin and wherein the inner flapper door is mounted on the inner door-support pin for pivotable movement relative to the nozzle-insertion housing from a closed position closing the inner nozzle-receiving aperture to an opened position opening the inner nozzle-insertion aperture, and the inner door-closing spring is mounted on the inner spring-support pin to lie in spaced-apart relation to the inner door-support pin and is arranged to yieldably urge the inner flapper door to the closed position.

5. The filler pipe closure of claim 4, wherein the inner door-closing spring includes a helically wound energy-storage unit, a first leg coupled to the helically wound energy-storage unit of the inner door-closing spring and arranged to engage the nozzle-insertion housing, and a second leg coupled to the helically wound energy-storage unit of the inner door-closing spring and arranged to engage the inner flapper door to apply a door-closing force to the inner flapper door normally to pivot the inner flapper door about the inner door-support pin to the closed position closing the nozzle-receiving aperture, and wherein the inner spring-support pin of the nozzle-insertion housing is arranged to extend through a pin-receiving channel formed in the helically wound energy-storage unit of the inner door-closing spring to locate the inner door-closing spring in spaced-apart relation to the inner door-support pin.

6. A filler pipe closure for a fuel filler pipe associated with a vehicle fuel tank, the filler pipe closure comprising a nozzle-insertion housing formed to include a nozzle-receiving aperture and sized to extend into a fuel-conducting passageway, the nozzle-insertion housing including a door-support pin and a spring-support pin arranged to lie in spaced-apart relation to the door-support pin, an inner flapper door mounted on the door-support pin for pivotable movement relative to the nozzle-insertion housing from a closed position closing the nozzle-receiving aperture to an opened position opening the nozzle-receiving aperture, and a door-closing spring mounted on the spring-support pin to lie in spaced-apart relation to the door-support pin and arranged to yieldably urge the inner flapper door to the closed position, wherein the nozzle-insertion housing includes an aperture rim that is formed to include the nozzle-receiving aperture and is arranged to surround an axially extending aperture centerline that extends through the nozzle-receiving aperture, the door-support pin is located a first distance from the axially extending aperture centerline, and the spring-support pin is located a relatively greater second distance from the axially extending aperture centerline, and wherein the nozzle-insertion housing further includes a pin-support member having an outer segment formed to include an nozzle-receiving up stream channel terminating at the nozzle-receiving aperture and an inner segment formed to include a downstream nozzle-receiving channel and coupled to the outer segment to place the upstream and downstream nozzle-receiving channels in fluid communication with one another via the nozzle-receiving aperture, the door-support pin is coupled to the outer segment of the pin-support member, and a spring-support member is coupled to the inner segment of the pin-support member.

7. The filler pipe closure of claim 6, wherein the door-closing spring includes a helically wound energy-storage unit, a first leg coupled to the helically wound energy-storage unit and arranged to engage the nozzle-insertion housing, and a second leg coupled to the helically wound energy-storage unit and arranged to engage the inner flapper door to apply a door-closing force to the inner flapper door normally to pivot the inner flapper door about the door-support pin to the closed position closing the nozzle-receiving aperture, and wherein the spring-support pin of the nozzle-insertion housing is arranged to extend through a pin-receiving channel formed in the helically wound energy-storage unit to locate the door-closing spring in spaced-apart relation to the door-support pin.

8. The filler pipe closure of claim 6, wherein the door-closing spring includes a helically wound energy-storage unit, a first leg coupled to the helically wound energy-storage unit and arranged to engage the nozzle-insertion housing, and a second leg coupled to the helically wound energy-storage unit and arranged to engage the inner flapper door to apply a door-closing force to the inner flapper door normally to pivot the inner flapper door about the door-support pin to the closed position closing the nozzle-receiving aperture, and wherein the spring-support pin of the nozzle-insertion housing is arranged to extend through a pin-receiving channel formed in the helically wound energy-storage unit to locate the door-closing pin in spaced-apart relation to the door-support pin.

9. The filler pipe closure of claim 6, wherein the door-support and spring-support pins are arranged to lie in spaced-apart parallel relation to one another and the axially extending aperture centerline is arranged to lie in spaced-apart parallel relation to a reference line that is perpendicular to the door-support pin.

10. The filler pipe closure of claim 6, wherein the pin-support member is a monolithic component made of a plastics material molded to include the door-support and spring-support pins.

11. The filler pipe closure of claim 6, wherein the outer segment of the pin-support member of the nozzle-insertion housing is formed to provide the nozzle-receiving upstream channel with a funnel-shaped nozzle inlet passageway, a wide-diameter outlet passageway opening toward the inner flapper door when the inner flapper door occupies the closed position, and a relatively narrower narrow-diameter transition passageway interconnecting the funnel-shaped nozzle inlet passageway and the wide-diameter nozzle outlet passageway, and the outer segment of the pin-support member includes an internal protrusion having a radially inwardly facing exterior boundary surface that faces toward the axially extending aperture centerline and defines a portion of boundary of the funnel-shaped nozzle inlet and narrow-diameter transition passageways and an axially inwardly facing exterior surface that faces toward the inner flapper door and defines a ceiling boundary of the wide-diameter nozzle outlet passageway, and the radially inwardly facing exterior boundary surface and the axially inwardly facing exterior surface meet to establish a hidden leading door edge arranged to minimize damage to the inner flapper door during insertion of a fuel-dispensing pump nozzle into the nozzle-receiving aperture formed in the nozzle-insertion housing.

12. The filler pipe closure of claim 11, wherein the outer segment of the pin-support member includes a funnel wall bounding the funnel-shaped nozzle inlet passageway to provide means for guiding a tip of the fuel-dispensing pump nozzle away from the door-support pin during insertion of the fuel-dispensing pump nozzle into the nozzle-insertion housing through the upstream nozzle-receiving channel, the nozzle-receiving aperture, and the downstream nozzle-receiving channel so that damaging contact by the fuel-dispensing pump nozzle and the inner flapper door is minimized.

13. The filler pipe closure of claim 6, wherein the door-closing spring comprises a helically wound energy-storage unit comprising several units mounted on the spring-support pin to lie in spaced-apart relation to the inner flapper door to provide a separation space between the door-support pin and the helically wound energy-storage unit to receive portions of the coils and maximize the number of coils included in the helically wound energy-storage unit.

14. The filler pipe of claim 13, wherein the outer segment includes a funnel wall bounding the funnel-shaped nozzle inlet passageway to provide means for guiding a tip of the fuel-dispensing pump nozzle away from the door-support pin during insertion of the fuel-dispensing pump nozzle into the nozzle-insertion housing through the upstream nozzle-receiving channel, the nozzle-receiving aperture, and the downstream nozzle-receiving channel so that damaging contact by the fuel-dispensing pump nozzle and the inner flapper door is minimized.

15. The filler pipe closure of claim 6, wherein the nozzle-insertion housing includes an aperture rim that is formed to include the nozzle-receiving aperture and the aperture rim establishes a transverse reference plane that extends through a space provided between the door-support pin and the spring-support pin to locate the door-support pin on one side of the transverse reference plane and to locate the spring-support pin on an opposite side of the transverse reference plane.

16. The filler pipe of claim 15, wherein the door-closing spring includes a helically wound energy-storage unit, a first leg coupled to the helically wound energy-storage unit and arranged to engage the nozzle-insertion housing, and a second leg coupled to the helically wound energy-storage unit and arranged to engage the inner flapper door to apply a door-closing force to the inner flapper door normally to pivot the inner flapper door about the door-support pin to the closed position closing the nozzle-receiving aperture, and wherein the spring-support pin of the nozzle-insertion housing is arranged to extend through a pin-receiving channel formed in the helically wound energy-storage unit to locate the door-closing pin in spaced-apart relation to the door-support pin.

17. The filler pipe closure of claim 15, wherein the aperture rim surrounds an axially extending aperture centerline that is normal to the transverse reference plane, the door-support pin is located a first distance from the axially extending aperture centerline, and the spring-support pin is located a relatively greater second distance from the axially extending aperture centerline.

* * * * *